United States Patent
Lee et al.

(10) Patent No.: US 7,842,410 B2
(45) Date of Patent: Nov. 30, 2010

(54) POLYMER ELECTROLYTE MEMBRANE AND FUEL CELL INCLUDING THE POLYMER ELECTROLYTE MEMBRANE

(75) Inventors: Jin-gyu Lee, Seoul (KR); Sang-kook Mah, Seoul (KR); Myung-sup Jung, Seongnam-si (KR); Young-gyoon Ryu, Suwon-si (KR); Jae-jun Lee, Suwon-si (KR); Do-yun Kim, Seongnam-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1064 days.

(21) Appl. No.: 11/543,468

(22) Filed: Oct. 4, 2006

(65) Prior Publication Data

US 2007/0104993 A1    May 10, 2007

(30) Foreign Application Priority Data

Oct. 7, 2005  (KR) .................. 10-2005-0094508
Feb. 23, 2006  (KR) .................. 10-2006-0017878

(51) Int. Cl.
*H01M 8/10* (2006.01)

(52) U.S. Cl. .................. 429/33; 429/44; 423/447.1; 423/460; 560/82; 549/263; 516/32

(58) Field of Classification Search .................. 429/33, 429/44; 423/447.1, 460; 560/82; 549/263; 516/32
See application file for complete search history.

(56) References Cited

U.S. PATENT DOCUMENTS

| | | | |
|---|---|---|---|
| 6,203,814 B1 | 3/2001 | Fisher et al. | |
| 6,495,290 B1 | 12/2002 | Hinokuma et al. | |
| 6,531,513 B2* | 3/2003 | Haddon et al. | 516/32 |
| 6,538,153 B1* | 3/2003 | Hirsch et al. | 560/82 |
| 6,890,676 B2 | 5/2005 | Nuber et al. | |
| 7,125,533 B2* | 10/2006 | Khabashesku et al. | 423/447.1 |
| 7,670,831 B2* | 3/2010 | Lee et al. | 435/283.1 |

(Continued)

FOREIGN PATENT DOCUMENTS

JP  2003-086022  3/2003

(Continued)

OTHER PUBLICATIONS

Japanese Office action dated May 11, 2010, for corresponding Japanese Patent application 2006-273406, noting listed references in this IDS.

(Continued)

*Primary Examiner*—Peter D. Mulcahy
*Assistant Examiner*—Henry Hu
(74) *Attorney, Agent, or Firm*—Christie, Parker & Hale, LLP

(57) ABSTRACT

A solid acid including a carbon nanotube (CNT), a spacer group combined with the CNT and an ionically conductive functional group connected to the spacer group. A polymer electrolyte membrane may include the same composition, and may be used in a fuel cell. The polymer electrolyte membrane using the solid acid has excellent ionic conductivity and suppresses the cross-over of methanol. The polymer electrolyte membrane is used as an electrolyte membrane of a fuel cell, for example, a direct methanol fuel cell.

10 Claims, 12 Drawing Sheets

U.S. PATENT DOCUMENTS

| | | | |
|---|---|---|---|
| 2004/0167014 A1* | 8/2004 | Yan et al. .................... | 502/101 |
| 2005/0214195 A1* | 9/2005 | Jung et al. .............. | 423/445 B |
| 2005/0221139 A1* | 10/2005 | Hampden-Smith et al. .... | 429/32 |
| 2006/0199770 A1* | 9/2006 | Bianco et al. ................. | 514/17 |
| 2010/0112276 A1* | 5/2010 | Tsiper et al. ................ | 428/114 |

FOREIGN PATENT DOCUMENTS

| | | | |
|---|---|---|---|
| JP | 2003-187636 | | 7/2003 |
| WO | WO-00/17101 | * | 3/2000 |
| WO | WO 2005/011035 A1 | | 2/2005 |

OTHER PUBLICATIONS

Raffaelle, R.P., et al., "Carbon nanotubes for power applications," Materials Science & JHG JHG JHG PAS915283.1-*-Aug. 16, 2010 9:55 AM.

Chinese Office action dated Jun. 11, 2010 issued in corresponding Chinese patent Application No. 200610139996.X, with English translation listing the cited references in this IDS.

* cited by examiner

POLYMER ELECTROLYTE MEMBRANE AND FUEL CELL INCLUDING THE POLYMER ELECTROLYTE MEMBRANE

CROSS-REFERENCE TO RELATED PATENT APPLICATION

This application claims priority to and the benefit of Korean Patent Application Nos. 10-2005-0094508, filed on Oct. 7, 2005 and 10-2006-0017878, filed on Feb. 23, 2006, in the Korean Intellectual Property Office, the disclosures of which are incorporated herein in their entireties by reference.

BACKGROUND OF THE INVENTION

1. Field of the Invention

The present invention relates to a polymer electrolyte membrane and a fuel cell using the same, and more particularly, to a polymer electrolyte membrane having excellent ionic conductivity and low cross-over of methanol, and a fuel cell using the polymer electrolyte membrane.

2. Description of the Related Art

Conventional fuel cells can be classified into polymer electrolyte membrane fuel cells (PEMFC), phosphoric acid fuel cells, molten carbonate fuel cells, solid oxide fuel cells, etc. according to the type of electrolyte included therein. The operating temperature of a fuel cell and the constituent materials thereof are determined by the type of electrolyte used in the fuel cell.

Fuel cells can also be classified into an external reformer type fuel cell in which fuel is supplied to an anode after being converted into a hydrogen-rich gas by an external reformer, and an internal reformer type fuel cell or direct fuel supply type fuel cell in which a fuel in a gaseous or liquid state is directly supplied to an anode.

A representative example of a direct liquid fuel cell is a direct methanol fuel cell (DMFC). In a DMFC, an aqueous methanol solution is used as fuel, and a proton exchange polymer membrane with ionic conductivity is used as an electrolyte. Accordingly, a DMFC is a type of PEMFC.

PEMFCs are small and lightweight, but can achieve a high output density. Furthermore, a power generation system can be easily formed using PEMFCs.

The basic structure of a PEMFC may include an anode (fuel electrode), a cathode (oxidizing agent electrode), and a polymer electrolyte membrane interposed between the anode and the cathode. The anode may include a catalyst layer to promote the oxidation of a fuel. The cathode may include a catalyst layer to promote the reduction of an oxidizing agent.

In a PEMFC, the polymer electrolyte membrane acts as an ionic conductor for the migration of protons from the anode to the cathode and also acts as a separator to prevent contact between the anode and the cathode. The polymer electrolyte membrane therefore requires sufficient ionic conductivity, electrochemical stability, high mechanical strength and thermal stability at its operating temperature, and thin layers of the polymer electrolyte membrane should be easily formed.

However, since conventional polymer electrolyte membranes do not have satisfactory ionic conductivity and methanol cross-over, improvements in polymer electrolyte membranes are required.

SUMMARY OF THE INVENTION

In one embodiment, the present invention provides a polymer electrolyte membrane having improved ionic conductivity to effectively prevent cross-over of methanol and a solid acid, the forming materials of the polymer electrolyte membrane.

In another embodiment, the present invention also provides a fuel cell having improved efficiency due to low methanol cross-over by using the polymer electrolyte membrane.

According to an embodiment of the present invention, a solid acid is provided including: a carbon nanotube (CNT); spacer particles combined with the CNT; and an ionically conductive functional group connected to the spacer particles.

In one embodiment, the spacer particles may be —$C_6H_4$— and the ionically conductive functional group may be —$SO_3H$.

In another embodiment, the solid acid of the present invention is represented by Chemical Formula 1.

Chemical Formula 1
CNT—(CO—$R_1$—X)$_n$ where CNT is a single walled carbon nanotube (SWNT) or a multi walled carbon nanotube, $R_1$ is divalent organic group, X is a univalent ionically conductive functional group, and n is an integer equal to or greater than 1.

According to another embodiment of the present invention, a polymer electrolyte membrane is provided including: an ionic conducting polymer; and the solid acid described above.

According to another embodiment of the present invention, a fuel cell is provided including: a cathode; an anode; and a polymer electrolyte membrane interposed between the cathode and the anode, the polymer electrolyte membrane comprising an ionic conducting polymer and the solid acid described above.

In one embodiment, the cathode may include a catalyst layer including platinum catalyst supported on carbon and the anode may include a catalyst layer including platinum-ruthenium catalyst supported on carbon.

BRIEF DESCRIPTION OF THE DRAWINGS

The above and other embodiments of the present invention will become more apparent by describing in detail exemplary embodiments with reference to the attached drawings in which.

DETAILED DESCRIPTION

Figure 1A:
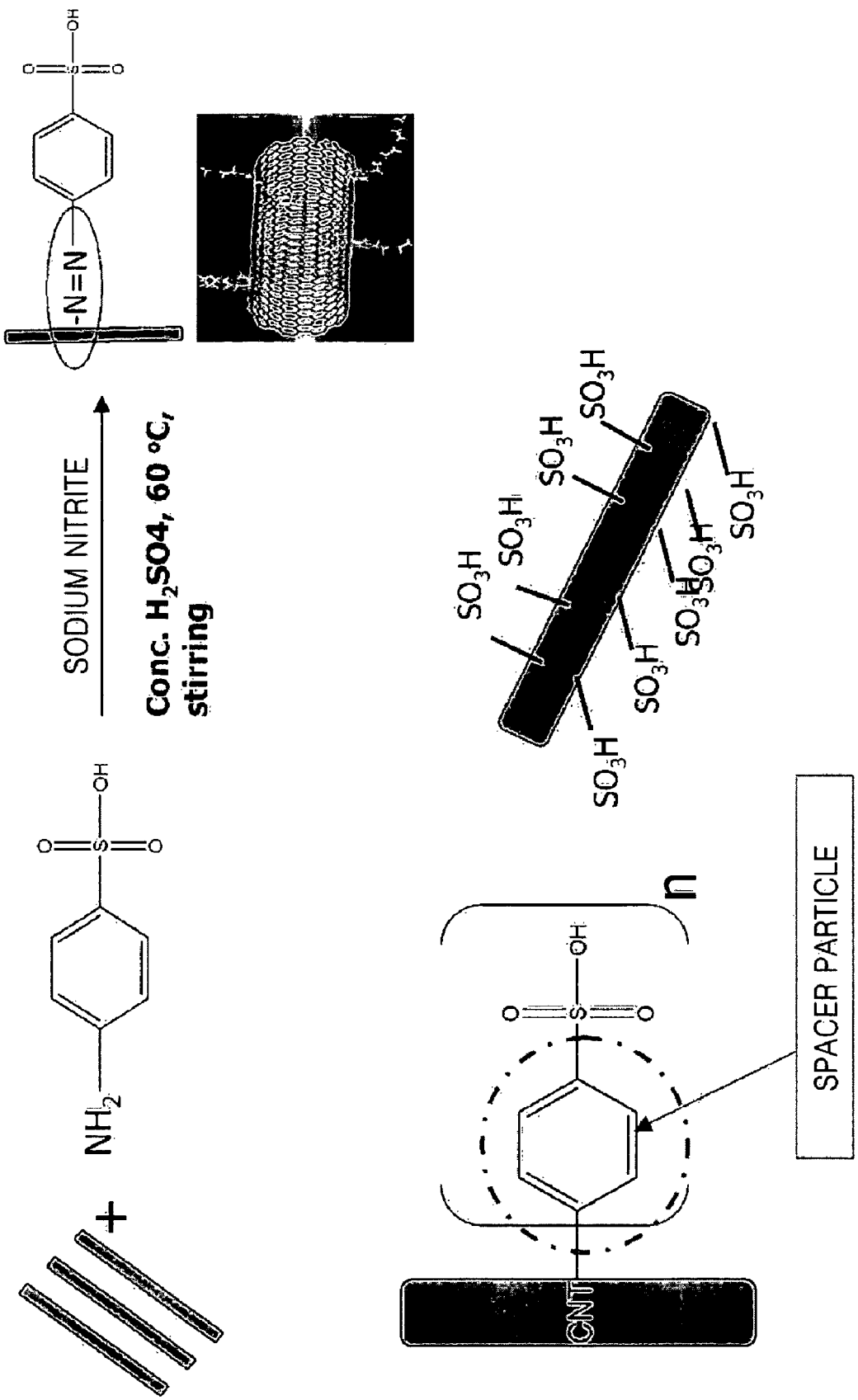
FIG. 1A is a diagram illustrating a process of manufacturing a sulfonated carbon nanotube (CNT) according to an embodiment of the present invention.

A sulfonated carbon nanotube (CNT) according to an embodiment of the present invention is a solid acid including a CNT, spacer particles combined with the CNT, and an ionically conductive functional group connected to the spacer particles.

The spacer particles in one embodiment of the present invention, connect the CNT and the ionically conductive functional group and may be a divalent aromatic group, a divalent aliphatic group, or a divalent aromatic group substituted with an aliphatic substituent.

In particular, in the solid acid according to an embodiment of the present invention, the spacer particles may be —$C_6H_4$— and the ionically conductive functional group may be —$SO_3H$.

A sulfonated CNT according to an embodiment of the present invention is represented by Formula 1 below prepared by modifying a carboxylated CNT as a solid acid:

Chemical Formula 1

CNT—(CO—$R_1$—X)$_n$, where CNT is a single-walled carbon nanotube (SWNT) or multi-walled carbon nanotube (MWNT), $R_1$ is divalent organic group, X is a univalent ionically conductive functional group, and n is an integer of 1 or greater, and in one embodiment, n is 1-20.

The CNT in Chemical Formula 1 according to an embodiment is a SWNT.

In an embodiment, $R_1$ can be —$OR_2$— or —$NHR_3$— where $R_2$ and $R_3$ are each independently a divalent aromatic group, a divalent aliphatic group, or a divalent aromatic group substituted with an aliphatic substituent.

The sulfonated CNT in the Chemical Formula 1 can be a compound represented by Chemical Formula 3 or 4.

Chemical Formula 3

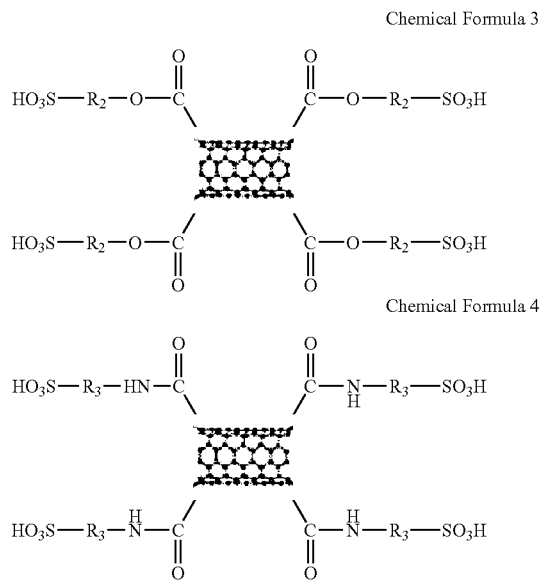

Chemical Formula 4 where, $R_2$ and $R_3$ are defined as in Chemical Formula 1. In an embodiment of the present invention, $R_2$ is a $C_1$-$C_{20}$ alkylene group and $R_3$ is a $C_1$-$C_{20}$ arylene group.

The structural formula below represents a CNT.

According to one embodiment, the compound in Chemical Formula 3 can be a compound represented by Chemical Formula 5 and the compound in Chemical Formula 4 can be a compound represented by Chemical Formula 6.

Chemical Formula 5

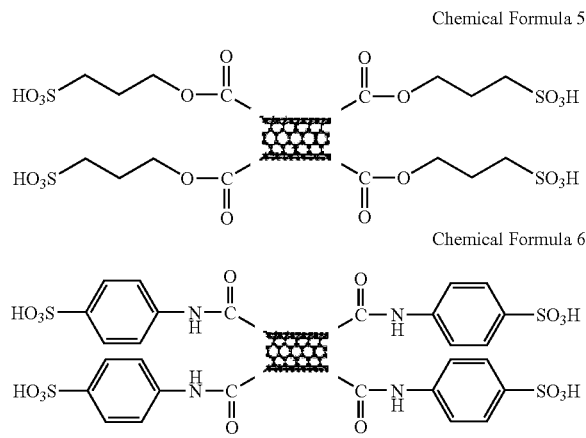

Chemical Formula 6

The term, "aromatic group" refers to aromatic hydrocarbons containing $C_6$-$C_{30}$ aromatic hydrocarbons such as phenylene, naphthylene, tetrahydronaphthylene, indanylene, and biphenylene or $C_6$-$C_{30}$ heteroaromatic hydrocarbons containing one or more heteroatoms selected from the group consisting of oxygen (O), nitrogen (N), and sulfur (S). The aromatic group includes substituents such as $C_1$-$C_8$ alkyl, hydroxy, halogen atoms, $C_1$-$C_{10}$ haloalkyl, nitro, cyano, and $C_1$-$C_8$ alkoxy.

The term, "aliphatic group" refers to a $C_1$-$C_{20}$ alkylene group, a $C_1$-$C_{20}$ alkyleneoxy group, a $C_1$-$C_{20}$ alkylenecarbonylalkylene group, a $C_1$-$C_{20}$ alkenylene group, a $C_1$-$C_{20}$ alkynylene group, or a $C_1$-$C_{20}$ carbocyclic compound, and includes a substituent such as a $C_1$-C8 alkyl, hydroxy, a halogen atom, $C_1$-C10 haloalkyl, nitro, cyano, or $C_1$-C10 alkoxy.

The term "aromatic group substituted with an aliphatic group" indicates when the aromatic group has an aliphatic substituent. The substituent for the aliphatic group may be a divalent substituent such as a $C_1$-C8 alkylene.

Examples of the aromatic group include compounds such as unsubstituted phenylene (—$C_6H_4$—), substituted phenylene (for example, $C_6H_3X^1$—, —$C_6H_2(X^2{}_2)$—), —$C_6H_4$NH$C_6H_3X^3$—, —$C_6H_4$CO$C_6H_4$—, —$C_{6H4}$S $C_6H_4$— (diphenyl sulfide), unsubstituted naphthylene(—$C_{10}H_6$—) and substituted naphthylene(—$C_{10}H_4X^4$—).

Here, $X^1$ through $X^4$ are each independently —F, —Cl, —Br, —I, —$NH_2$, a methyl group, an ethyl group, a propyl group, a methoxy group, an ethoxy group, a hydroxy group, a nitro group, or a propyloxy group.

Examples of the aliphatic group include compounds such as —$(CH_2)_n$— (n is an integer from 1 to 12), —$CH_2CH_2O$—, —$CH_2CH_2CH(OH)$—, —$CH_2CH(OH)CH_2$—, —$CH_2COCH_2CH_2$—, —$(CH=CH)_n$— (n is an integer from 1 to 12), —$(CH_2CH_2NH)_n$—, (cyclopropane), —$C_5H_8$-(cyclopentane), —$C_6H_{10}$-(cyclohexane), and —$CH_2C_6H_{10}$—.

Examples of the aromatic group having the aliphatic substituent include —$C_6H_4(CH_2)_n$—, (n is an integer from 1 to 3), —$C_6H_4CONHCH_2CH_2$—, —$CH_2C_6H_4SC_6H_4CH_2$—, or —$C_6H_4CH_2CH_2$—.

The ionically conductive functional group may be any functional group that conducts protons such as —$SO_3H$, —$COOH$, —$PO_3H$, —$OH$, —$OSO_3H$, or —$OPO(OH)_3$, but is not limited thereto.

A method of manufacturing the sulfonated CNT according to an embodiment of the present invention will be now described. The sulfonated CNT includes a CNT, spacer particles combined with the CNT, and an ionically conductive functional group (proton conductive group) connected to the spacer particles.

A diazo compound is formed by performing a diazo-coupling reaction between the CNT and a compound having both a spacer group and a proton conductive functional group (hereinafter, referred to as "a compound containing a spacer group") in the presence of acid and sodium nitrite, and the desired sulfonated CNT can be obtained using the diazo compound.

According to an embodiment, a concentrated sulfuric acid solution is used as the acid in the formation of the diazo compound, and the amount of the acid may be in the range of 1-200 moles based on 1 mole of the compound containing the spacer group. When the amount of the acid is less than 1 mole of the acid, a reaction that cuts the CNT may not occur. When the amount of the acid is more than 200 moles, excessive acid may generate heat and it may be difficult to control the reaction.

Examples of the compound containing the spacer group according to one embodiment include $H_2N$—$C_6H_4$—$SO_3H$, $NH_2$—$(CH_2)_n$—$SO_3H$(n is 1-12), $H_2N$—$CH_2CH_2O$—$SO_3H$, $H_2N$—$CH_2CH_2CH(OH)$—$SO_3H$, $H_2N$—$CH_2CH(OH)CH_2$—$SO_3H$, $H_2N$—$CH_2COH_2CH_2$—$SO_3H$, or 4-(2-aminoethyl) benzoic acid ($H_2N$—$CH_2CH_2C_6H_4CO_2H$), N-(4-aminobenzoyl)-β-aniline($H_2N$—$C_6H_4CONHCH_2CH_2$—$CO_2H$), 2-[2-(aminomethyl)phenylthio]benzyl alcohol ($H_2N$—$CH_2C_6H_4SC_6H_4CH_2$—$OH$), 2-aminophenylethyl alcohol ($H_2N$—$C_6H_4CH_2CH_2$—$OH$), 4-aminophenylethyl alcohol ($H_2N$—$C_6H_4CH_2CH_2$—$OH$), 3-aminophenylacetic acid ($H_2N$—$C_6H_4CH_2$—$CO_2H$), 4-aminophenylacetic acid($H_2N$—$C_6H_4CH_2$—$CO_2H$), 4-amino-D-phenylalanine hydrate ($H_2N$—$C_6H_4CH_2CH$-$NH_2CO_2H$), 4-amino-DL-phenylalanine hydrate ($H_2N$—$C_6H_4CH_2CH$-$NH_2CO_2H$), 4-amino-L-phenylalanine hydrate ($H_2N$—$C_6H_4CH_2CH$—$NH_2CO_2H$), and 4-(4-aminophenyl) butyric acid ($H_2N$—$C_6H_4(CH_2)_3$—$CO_2H$).

In an embodiment, the amount of the compound containing the spacer group may be in the range of 10-300 parts by weight based on 10 parts by weight of the CNT. When the amount of the compound containing the spacer group is less than 10 parts by weight, the amount of a sulfone group chemically bonded to a surface of the CNT may be too low. When the amount of the compound containing the spacer group is greater than 300 parts by weight, the solubility of the compound containing the spacer group is low, and thus a non-uniform reaction solution is obtained.

In an embodiment, the amount of the sodium nitrite may be in the range of 0.1-5 moles based on 1 mole of the compound containing the spacer group. When the amount of the sodium nitrite is less than 0.1 moles, a diazo-coupling reaction may not occur. When the amount of sodium nitrite is more than 5 moles, excessive sodium nitrite may pollute the final product.

In one embodiment, the temperature of the diazo-coupling reaction may vary according to the type of the compound containing the spacer group, and may be in the range of 50-150° C.

FIG. 1A is a diagram illustrating a process of manufacturing the sulfonated CNT according to an embodiment of the present invention.

Referring to FIG. 1A, spacer particles and a plurality of $SO_3H$ groups are connected to the surface of a CNT.

Hereinafter, a method of manufacturing a solid acid according to an embodiment of the present invention will be described.

First, acid is added to a CNT such as refined SWNT, and ultrasonic waves are applied to the result at a temperature in the range of 30-100° C. to perform oxidation.

The acid may be sulfuric acid, nitric acid or mixtures thereof. In one embodiment, the amount of the acid may be in the range of 10,000-100,000 parts by weight based on 1 part by weight of the CNT. When the amount of the acid is less than 10,000 parts by weight, sufficient chemical oxidation to cut the CNT may not occur. When the amount of the acid is more than 100,000 parts by weight, excessive acid may exist and the CNT cut by chemical oxidation is difficult to collect.

Deionized water is added to the reacting mixture for dilution and centrifugal separation. In an embodiment, the centrifugal separation is performed for 10-20 minutes in the range of 4,000-10,000 rpm.

Figure 1B:
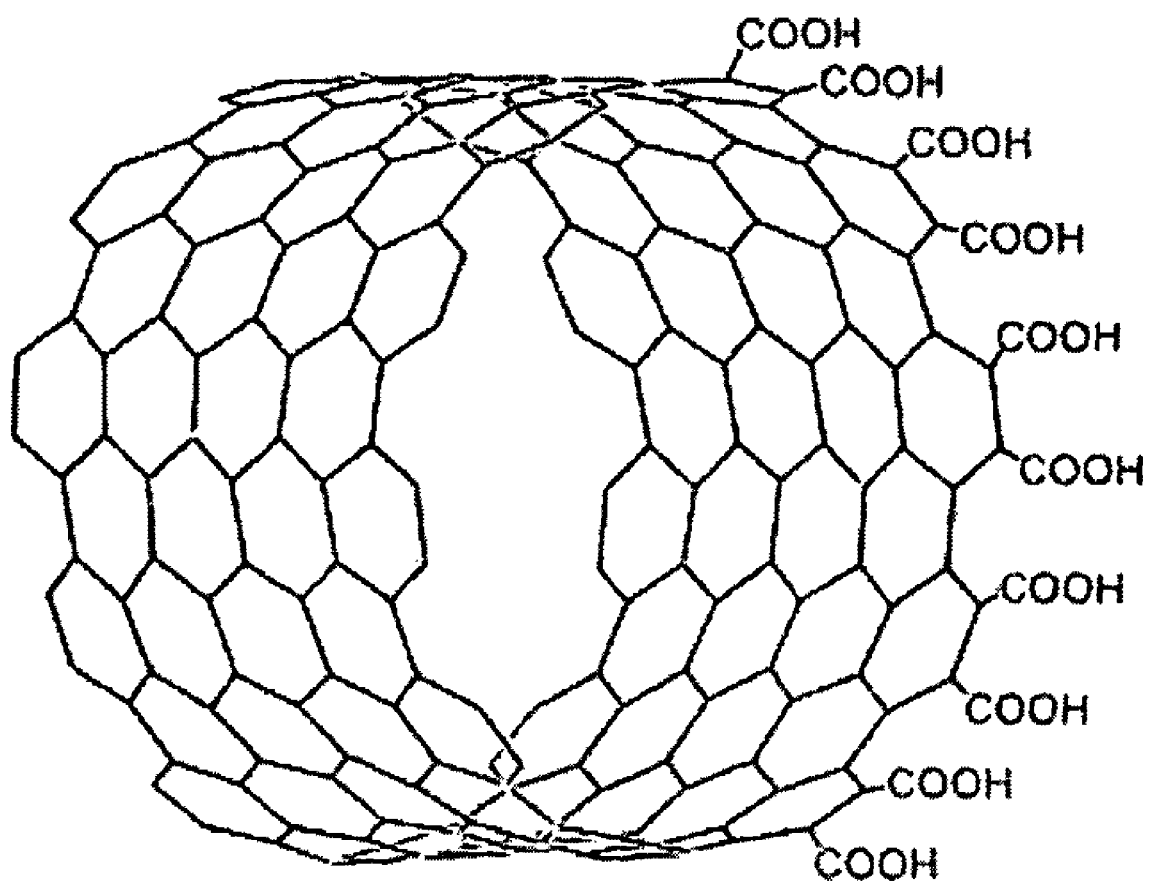
FIG. 1B is a schematic diagram of a carboxylated CNT obtained according to an embodiment of the present invention.

The centrifugally separated result is then filtered and washed using deionized water. In one embodiment, the washed result is dried under reduced pressure in the range of 40-100° C. and a carboxylated CNT as illustrated in FIG. 1B can be obtained.

In an embodiment, the length of the carboxylated CNT may be less than 500 nm, for example, in the range of 200-400 nm, and defects exist in the body and the end portion of a rope including about 13 carboxylic acids.

Referring to Reaction Scheme 1 below, a compound (C) is obtained by reacting a carboxylated CNT (A) and halogenated alkylsulfonium salt (B) with a base. In an embodiment, triethylamine or potassium carbonate ($K_2CO_3$) is used as the base and the amount of the base may be in the range of 1-1.5 moles based on 1 mole of halogenated alkylsulfonium salt (B).

In one embodiment, examples of the halogenated alkylsulfonium salt (B) include $Br(CH_2)_3SO_3Na$ and $Cl(CH_2)_3SO_3Na$ and the amount of the halogenated alkylsulfonium salt (B) may be in the range of 300-500 parts by weight based on 1 parts by weight of the carboxylated CNT (A). When the amount of halogenated alkylsulfonium salt (B) is out of this range, the reaction is not efficient or refining hardly occurs after the reaction is completed.

The sulfonated CNT (If $R_1$ is —$OR_2$ in Chemical Formula 1) represented in Chemical Formula 3 can be obtained by protonating the compound (C) using an acid. The acid can be an HCl aqueous solution. In one embodiment, the amount of the acid can be in the range of 100-200 parts by weight based on 1 part by weight of the compound (C). When the amount of the acid is out of this range, protonation may not efficient or collection of the CNT is difficult.

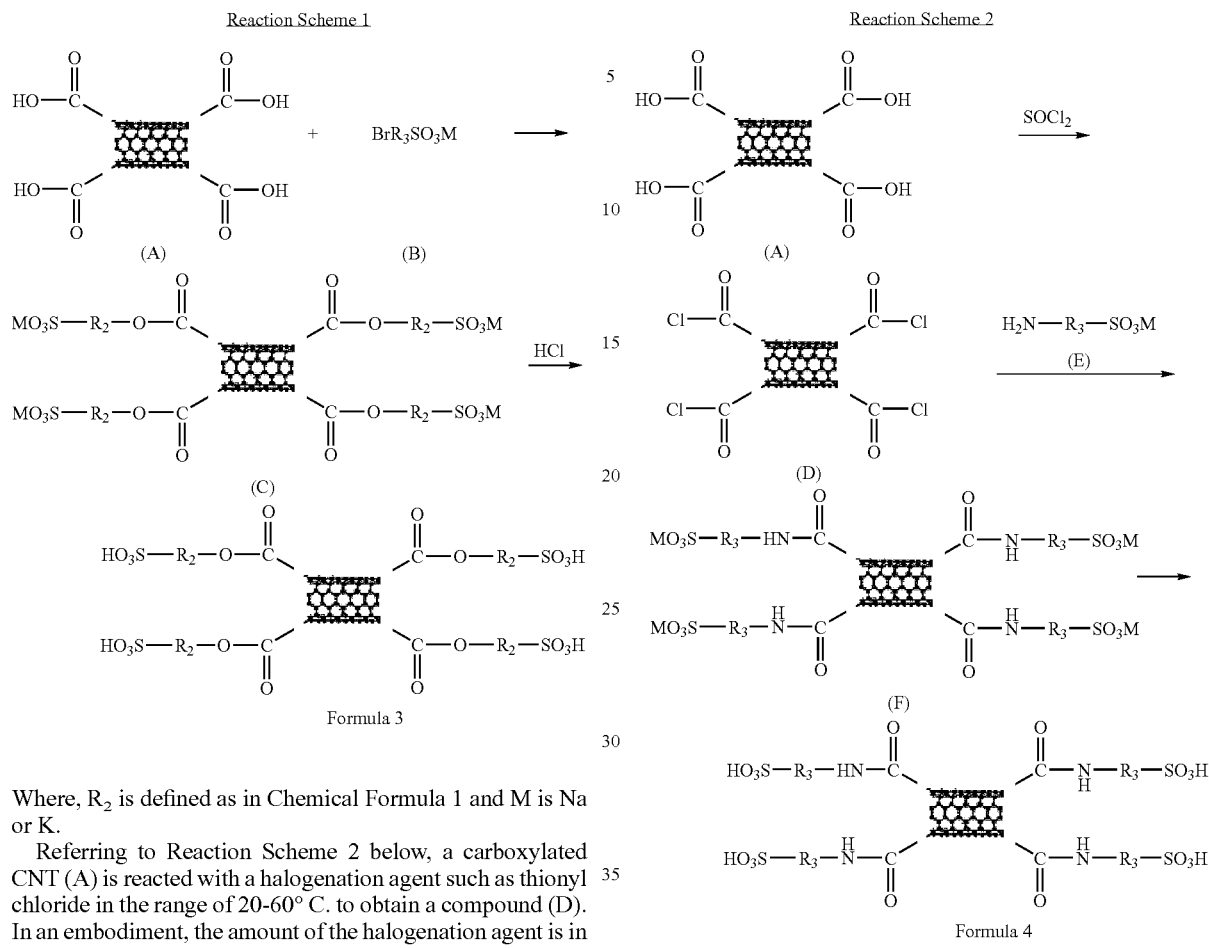

Where, $R_2$ is defined as in Chemical Formula 1 and M is Na or K.

Referring to Reaction Scheme 2 below, a carboxylated CNT (A) is reacted with a halogenation agent such as thionyl chloride in the range of 20-60° C. to obtain a compound (D). In an embodiment, the amount of the halogenation agent is in the range of 10-50 parts by weight based on 1 part by weight of the carboxylated CNT (A).

Then, the compound (D) is reacted with aminoalkylsulfonate (E) in the range of 20-60° C. to obtain a compound (F). According to an embodiment, the amount of aminoalkylsulfonate (E) may be in the range of 300-500 parts by weight based on 1 part by weight of the compound (D). When the amount of aminoalkylsulfonate (E) is out of this range, the reaction is not efficient or refining barely occurs after the reaction is completed.

The sulfonated CNT (If $R_1$ is —$NHR_3$ in Chemical Formula 1) represented in Chemical Formula 4 can be obtained by ionizing the compound (F) using an acid. The type and amount of acid required for the ionization are the same as in Reaction Scheme 1.

Where, $R_2$ is defined as in Chemical Formula 1 and M is Na or K.

In Reaction Schemes 1 and 2 according to one embodiment, an —$SO_3H$ group as an ionically conductive functional group is illustrated, but the ionically conductive functional group can include one or more compounds selected from the group consisting of —$PO_3H$, —OH, —$OSO_3H$ and —OPO$(OH)_3$, in which case compounds can be easily manufactured to use alkyl phosphates and alkyl hydroxide which enable the obtainment of the ionically conductive functional group instead of alkylsulfonates (B) and (E).

Detailed examples of Reaction Schemes 1 and 2 are represented by Reaction Schemes 3 and 4.

Reaction Scheme 3

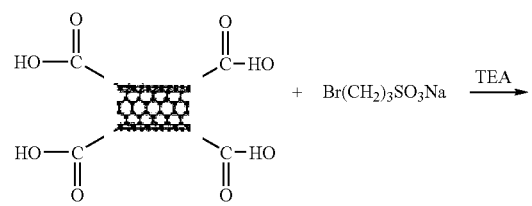

-continued

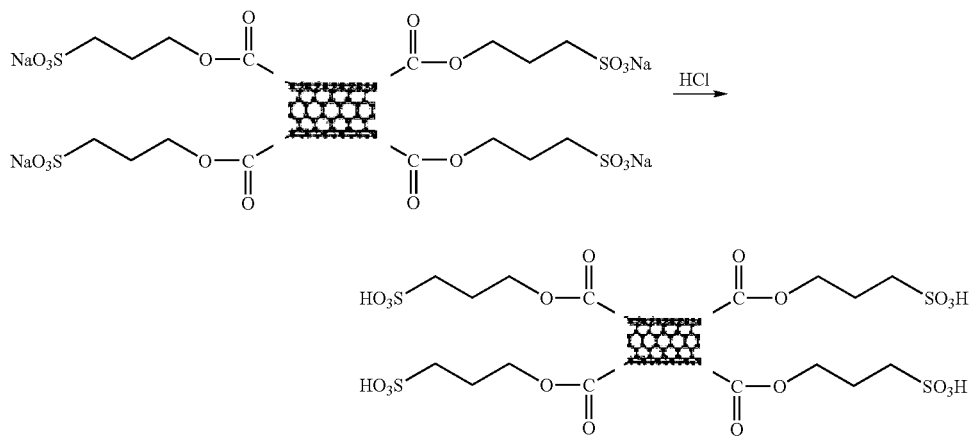

Reaction Scheme 4

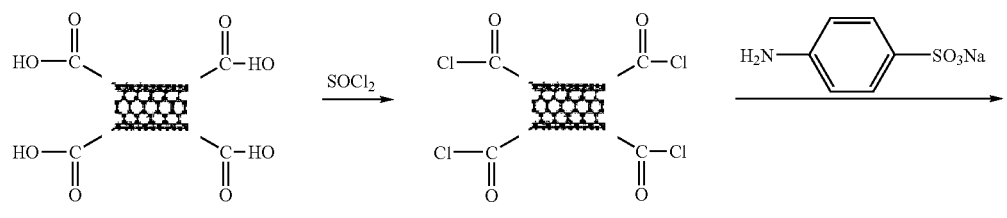

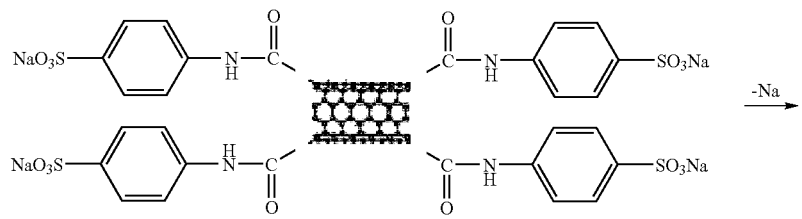

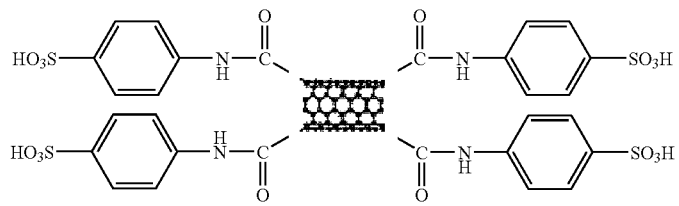

The solid acid according to an embodiment of the present invention is useful for manufacturing a polymer electrolyte membrane.

The polymer electrolyte membrane according to an embodiment of the present invention contains an ionic conducting polymer and the sulfonated CNT as the solid acid. The amount of the sulfonated CNT may be in the range of 0.1-40 parts by weight, for example, 0.1-15 parts by weight based on 100 parts by weight of the ionic conducting polymer.

When the amount of the sulfonated CNT is greater than 40 parts by weight, the mechanical strength of the polymer electrolyte membrane is low. When the amount of the sulfonated CNT is below 0.1 parts by weight the solid acid has little effect.

According to an embodiment, the ionic conducting polymer may include one or more materials selected from the group consisting of polyimide, polyalkylether, polyethylene carbonate, polyvinyl alcohol, polyethylenimine, Nafion, polyvinylidene fluoride, polyether sulfone, poly ether ether ketone, and copolymers thereof.

Examples of the polyimide include, but are not limited to, the compound represented by Chemical Formula 2 below.

Chemical Formula 2

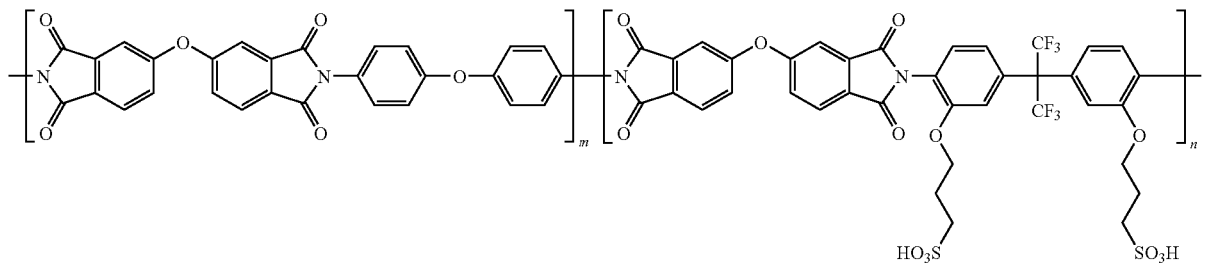

Where, m and n are molar fractions, m may be in the range of 0.1-0.9, for example, 0.3-0.7, and n may be in the range of 0.1-0.9, for example, 0.3-0.7.

In an embodiment, the degree of polymerization of the polyimide is in the range of 5-1000.

A method of manufacturing the polymer electrolyte membrane according to an embodiment of the invention is described below.

A composite for forming the polymer electrolyte membrane is obtained by mixing an ionic conducting polymer, the solid acid according to an embodiment of the present invention, and a solvent.

The amount of the solid acid is in the range of 0.1-40 parts by weight based on 100 parts by weight of the ionic conducting polymer. When the amount of the solid acid is below this range, the solid acid has little effect. When the amount of the solid acid is above this range, the mechanical strength of the polymer electrolyte membrane is low.

In an embodiment, examples of the solvent include N-methylpyrrolidone, N, N'-dimethylacetamide, dimethyl formamide, and dimethyl sulfoxide, and the amount of the solvent is in the range of 30-95 parts by weight based on 100 parts by weight of the ionic conducting polymer. When the amount of the solvent is below this range, a resultant solution has low uniformity. When the amount of the solvent is above this range, solid content is too low.

In an embodiment, the composite for forming the polymer electrolyte membrane is applied to a substrate. A method of applying the solvent may be, but is not limited to, spin coating or bar coating.

Next, the resulting product is heat treated.

In an embodiment, the heat treatment is a hard baking process performed at a temperature in the range of 120-200° C. When the temperature is below 120° C., the polymer membrane may not be sufficiently hardened. When the temperature is above 200° C., a sulfonate acid group contained in the polymer electrolyte membrane decomposes. The length of the heat treatment may vary according to the temperature, and according to an embodiment may be in the range of 0.5-4 hours.

In an embodiment of the present invention, a preliminary heat treatment can be performed prior to the above described heat treatment. The preliminary heat treatment is a soft baking process performed at a temperature in the range of 60-110° C. to remove a solvent from the coated composite. When the temperature is below 60° C., solvent removal is time consuming. When the temperature is above 110° C., the solvent is rapidly removed resulting in a non-uniform polymer electrolyte membrane. In an embodiment, the length of the heat treatment may vary according to the temperature, and may be in the range of 0.5-24 hours. The polymer electrolyte membrane obtained according to the above process can be used as the electrolyte membrane of a fuel cell.

The thickness of the polymer electrolyte membrane according to an embodiment of the present invention may be in the range of 5-200 µm. When the thickness is less than 5 µm, the polymer electrolyte membrane may tear. When the thickness is greater than 200 µm, a crack in the membrane can occur.

The fuel cell according to an embodiment of the present invention includes a cathode, an anode, and the polymer electrolyte membrane interposed between the cathode and the anode.

Each of the cathode and the anode includes a gas diffusion layer and a catalyst layer. The catalyst layer includes a metal catalyst to promote the required reactions (oxidation of hydrogen and reduction of oxygen). In one embodiment, the catalyst layer may include a catalyst selected from the group consisting of Pt, Ru, Os, a Pt—Os alloy, a Pt—Pd alloy, a Pt—M alloy, and combinations thereof (M includes a transition metal selected from the group consisting of Ga, Ti, V, Cr, Mn, Fe, Co, Ni, Cu, Zn, and combinations thereof). In another embodiment, the catalyst layer includes a catalyst selected from the group consisting of Pt, Ru, Os, a Pt—Ru alloy, a Pt—Os alloy, a Pt—Pd alloy, a Pt—Co alloy, a Pt-Ni alloy, and combinations thereof.

The metal catalyst can be supported on a carrier. The carrier may be carbon, such as acetylene black or graphite, or inorganic particulates, such as alumina or silica. A noble metal catalyst on a carrier, which is commercially available or may be prepared by impregnating the noble metal into the carrier, can be used.

The gas diffusion layer may be made of carbon paper or carbon cloth, but is not limited thereto. The gas diffusion layer supports the anode or the cathode and diffuses a reaction gas into the catalyst layer. The gas diffusion layer can be made of carbon paper or carbon cloth which is water-repellent treated with a fluorine-based resin such as polytetrafluoroethylene since the water repellence can prevent the lowering of the gas diffusion efficiency by water that can occur when the fuel cell operates.

In an embodiment, the electrodes can further include a microporous layer between the gas diffusion layer and the catalyst layer in order to further enhance the gas diffusion effect. In another embodiment, the microporous layer is formed by applying to the gas diffusion layer or the catalyst layer a composition including a conducting material, such as carbon powder, carbon black, activated carbon or acetylene black, a binder, such as polytetrafluoroethylene, and, if necessary, an ionomer.

The fuel cell according to an embodiment of the present invention may be a phosphoric acid fuel cell (PAFC), a polymer electrolyte membrane fuel cell (PEMFC), an alkaline fuel cell, or preferably a direct methanol fuel cell (DMFC).

A DMFC according to an embodiment of the present invention including the polymer electrolyte membrane will now be described with reference to FIG. 2.

Figure 2:
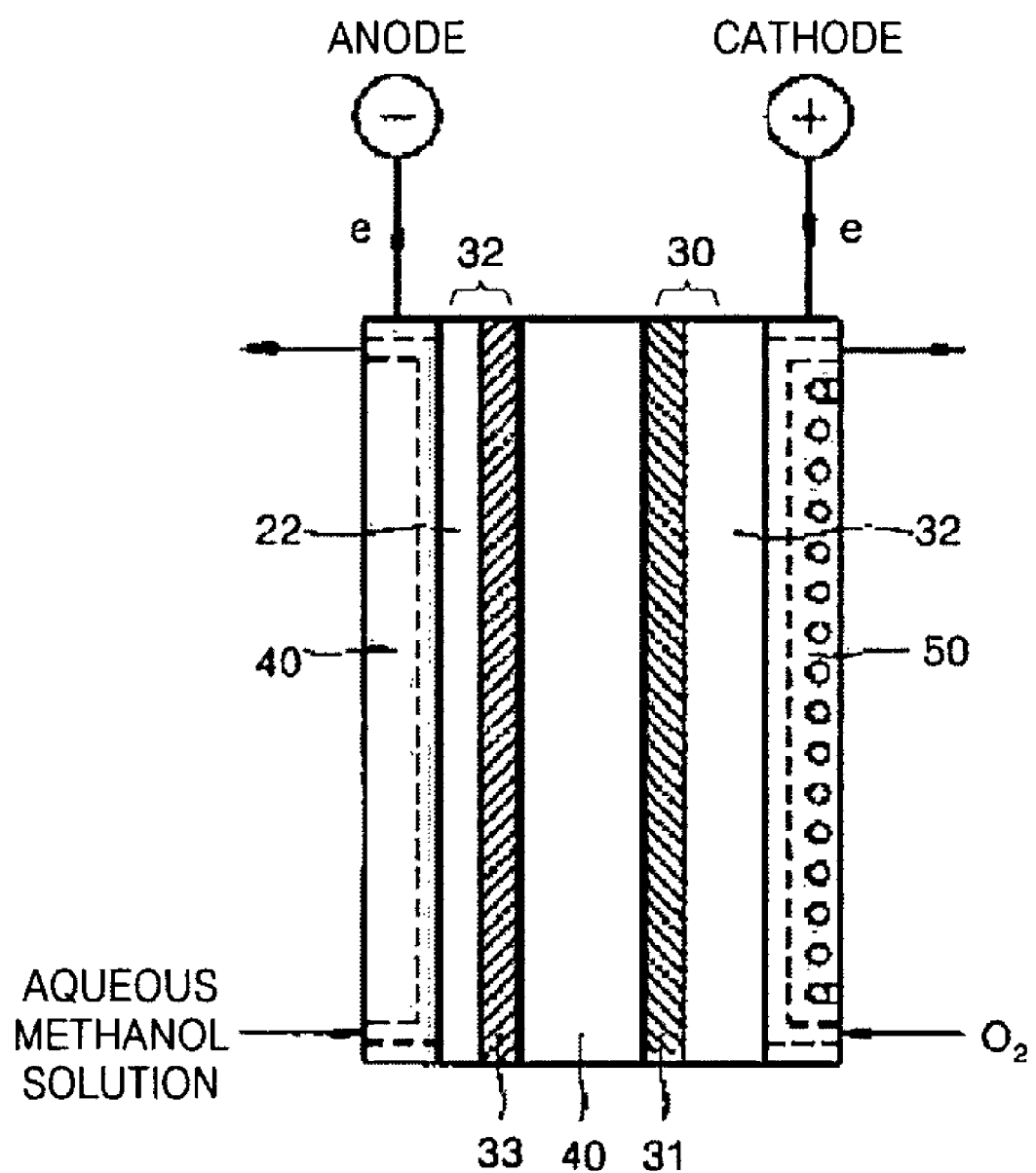
FIG. 2 is a diagram illustrating a structure of a direct methanol fuel cell (DMFC) according to an embodiment of the present invention.

The DMFC according to an embodiment of the present invention has the structure illustrated in FIG. 2.

Referring to FIG. 2, the DMFC includes an anode 32 to which a fuel is supplied, a cathode 30 to which an oxidant is supplied, and an electrolyte membrane 40 interposed between the anode 32 and the cathode 30. The anode 32 can be composed of an anode diffusion layer 22 and an anode catalyst layer 33 and the cathode 30 can be composed of a cathode diffusion layer 32 and a cathode catalyst layer 31.

A bipolar plate 40 provides a path for supplying the fuel to the anode 32 and acts as an electron conductor for transporting electrons produced in the anode to an external circuit or an adjacent unit cell. A bipolar plate 50 provides a path for supplying the oxidant to the cathode 30 and acts as an electron conductor for transporting electrons supplied from the external circuit or the adjacent unit cell to the cathode 30. In the DMFC, an aqueous methanol solution can be used as the fuel supplied to the anode 32 and air can be used as the oxidant supplied to the cathode 30.

The aqueous methanol solution transported to the anode catalyst layer 33 through the anode diffusion layer 22 is decomposed into electrons, protons, carbon dioxide, etc. The protons are transported to the cathode catalyst layer 31 through the polymer electrolyte membrane 41, the electrons are transported to an external circuit, and the carbon dioxide is discharged outside. In the cathode catalyst layer 31, the protons transported through the polymer electrolyte membrane 41, electrons supplied from an external circuit, and the oxygen in the air transported through the cathode diffusion layer 32 react to produce water.

The present invention will now be described in greater detail with reference to the following examples. The following examples are for illustrative purposes only and are not intended to limit the scope of the invention.

SYNTHESIS EXAMPLE 1

Synthesis of Solid Acid 1.73 g of sulfanilic acid and 1.73 g of sodium nitrate were added to 0.1 g of SWNT and the result was placed in a reactor.

The reactor was kept at 0° C. while 50 ml of concentrated sulfuric acid was added thereto and stirred regularly at 60° C. for 4 hours and 30 minutes to allow a reaction to occur. Then, a vacuum aspirator was connected to filter sulfuric acid from the reactor and a product of the reaction (CNT solid acid) was obtained. The CNT solid acid was washed several times with dimethylformamide as a solvent and washed several times again with diethylethers. The CNT solid acid was dried in a vacuum oven at 30° C. for 24 hours to obtain a desired CNT solid acid.

SYNTHESIS EXAMPLE 2

Synthesis of Solid Acid 1.39 g of 3-amino-1-propanesulfonic acid and 1.73 g of sodium nitrate were added to 0.1 g of SWNT and the result was placed in a reactor. The reactor was kept at 0° C. while 50 ml of concentrated sulfuric acid was added thereto and stirred regularly at 60° C. for 24 hours to allow a reaction to occur. Then, a vacuum aspirator was connected to filter sulfuric acid from the reactor and a product (CNT solid acid) was obtained. The CNT solid acid was washed several times with dimethylformamide as a solvent and washed again several times with diethylethers. The CNT solid acid was dried in a vacuum oven at 30° C. for 24 hours to obtain a desired CNT solid acid.

SYNTHESIS EXAMPLE 3

Synthesis of Solid Acid 1.41 g of 2-aminoethyl hydrogensulfate and 1.73 g of sodium nitrate were added to 0.1 g of SWNT and the result was placed in a reactor. The reactor was kept at 0° C. while 50 ml of concentrated sulfuric acid was added thereto and stirred regularly at 60° C. for 24 hours to allow a reaction to occur. Then, a vacuum aspirator was connected to filter sulfuric acid from the reactor and a product (CNT solid acid) was obtained. The CNT solid acid was washed several times with dimethylformamide as a solvent and washed again several times with diethylethers. The CNT solid acid was dried in a vacuum oven at 30° C. for 24 hours to obtain a desired CNT solid acid.

Figure 3:
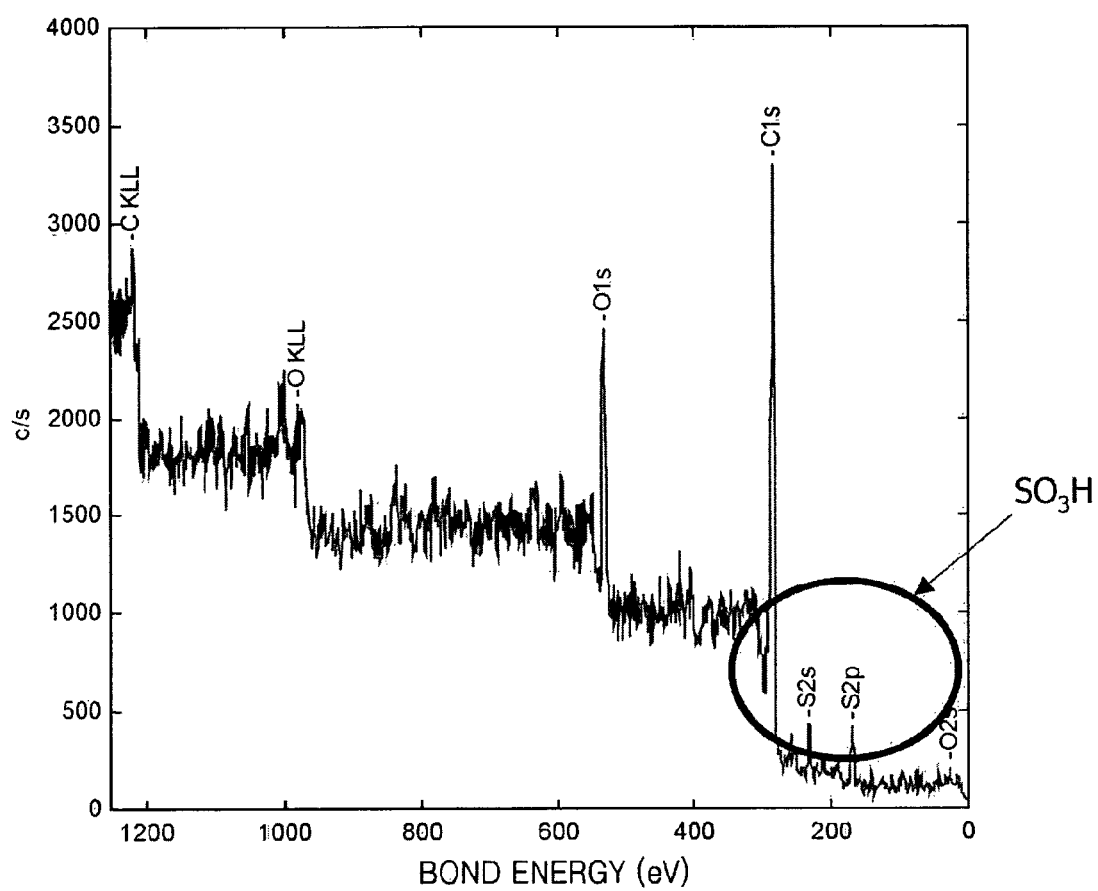
FIGS. 3 through 5 are graphs illustrating the results of X-ray photoelectron spectrum analysis of a sulfonated CNT according to an embodiment of the present invention.
Figure 4A:
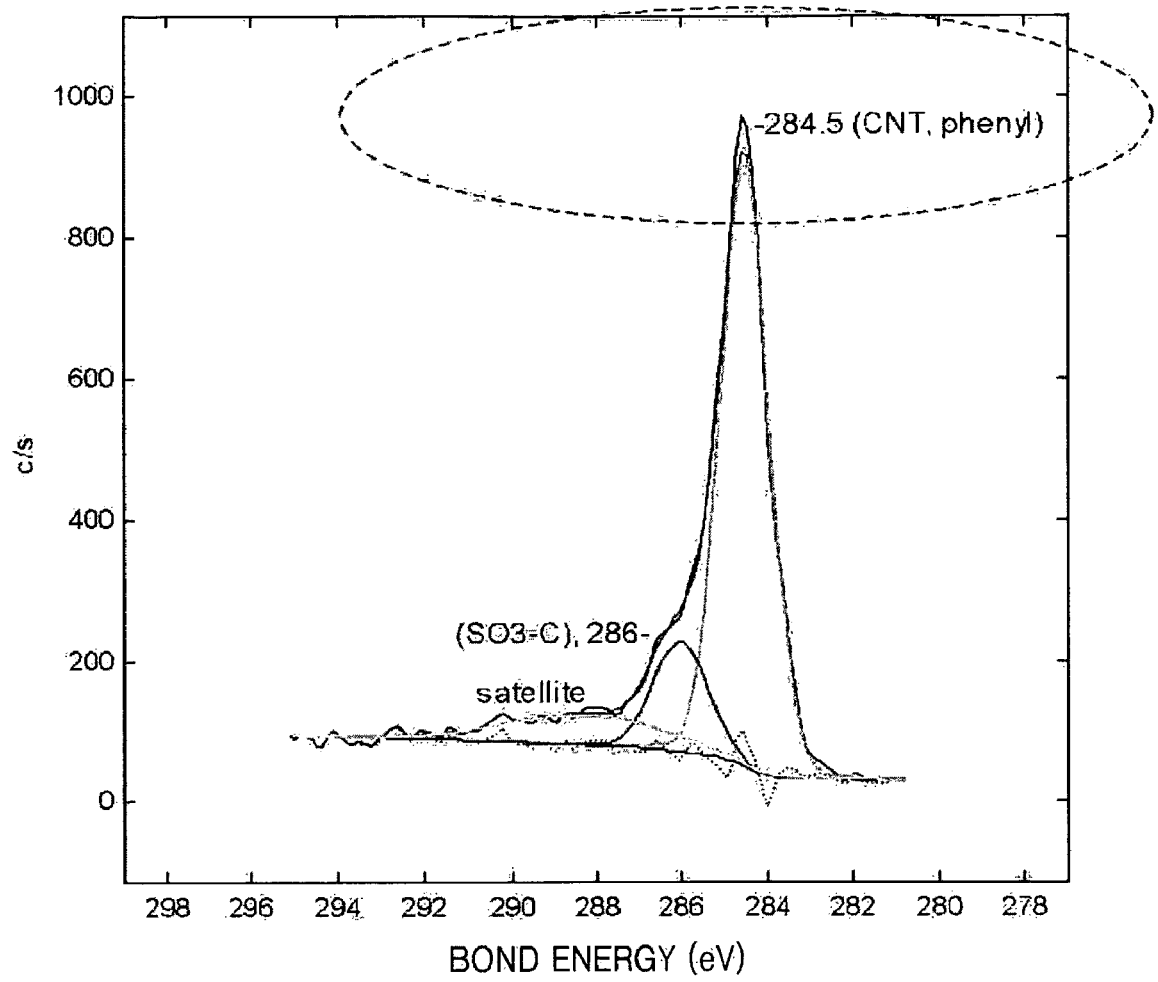
Figure 4B:
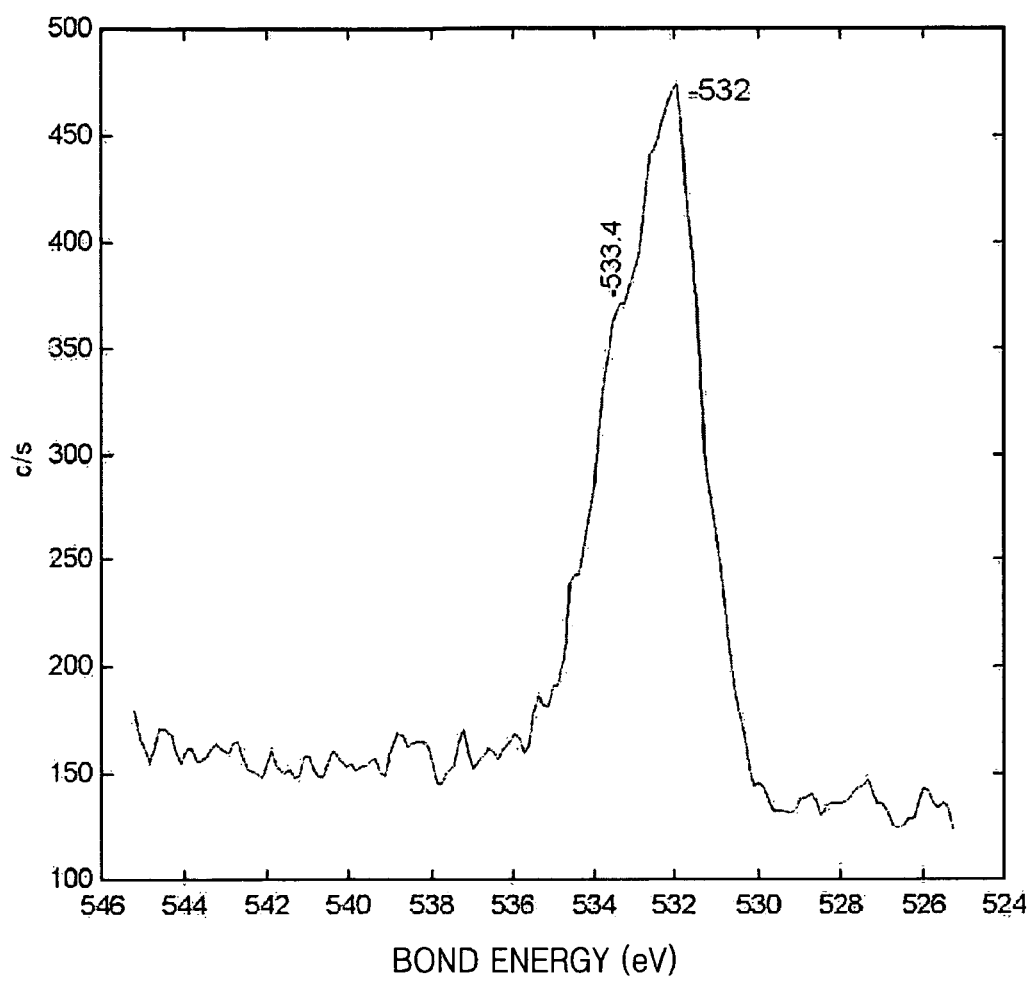
Figure 5:
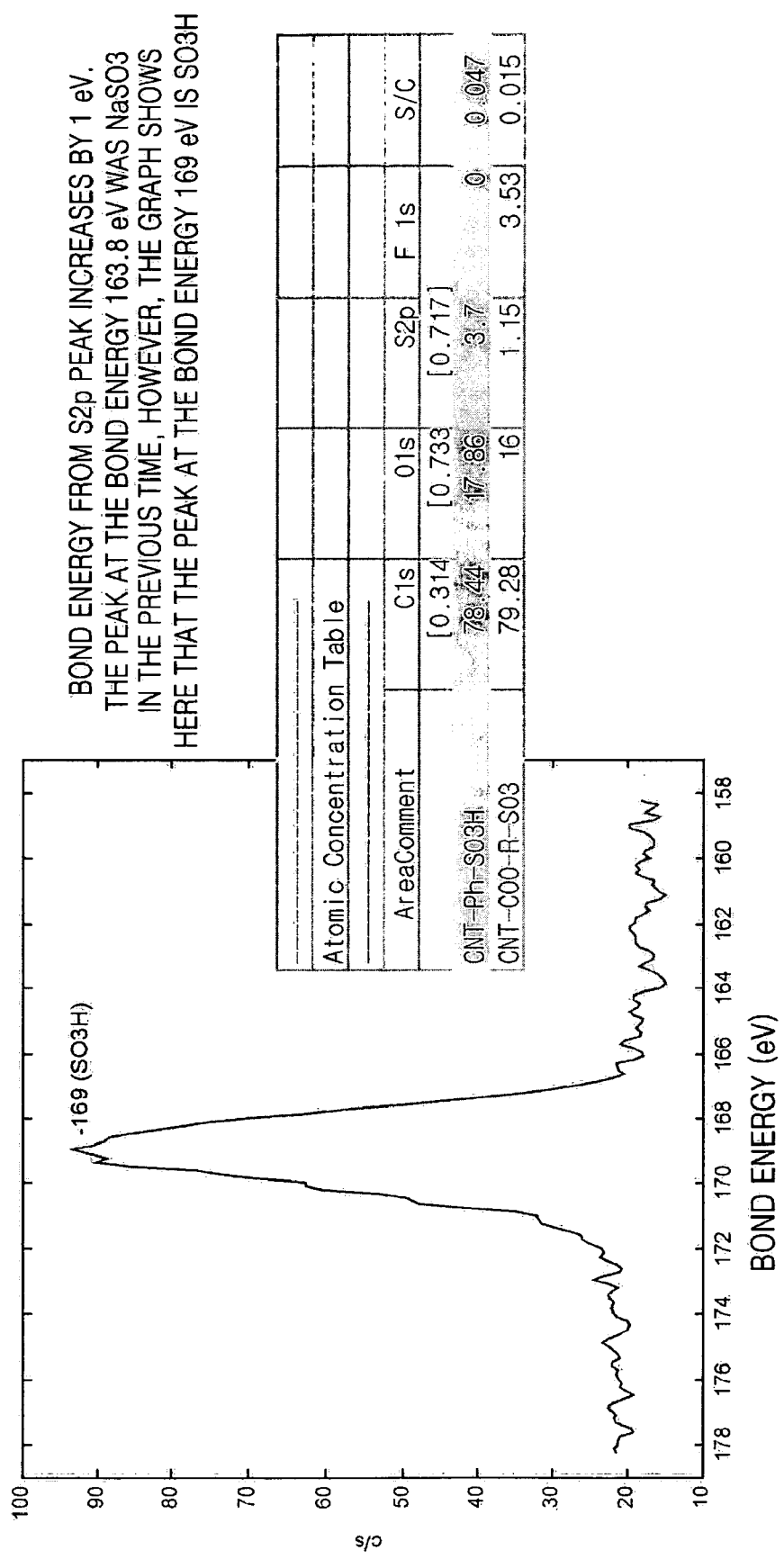

FIGS. 3 through 5 illustrate the X-ray photoelectron spectrums of the sulfonated CNT obtained in Synthesis Example 1.

Referring to FIG. 3, it can be seen that sulfur exists on a surface of the CNT in the form of —$SO_3H$ from the S2s and S2p peaks. Referring to FIGS. 4A and 4B, the carbon peak indicates that the carbon is in a CNT structure and a phenyl spacer group on the CNT shows a sharp peak at the bond energy of 284.5 eV, and a sulfone group, —C—$SO_3$, attached to the phenyl carbon compound is indicated by the peak at 286 eV. Referring to FIG. 5, the peak for S2p is identified at the bond energy of 169 eV and the —$SO_3$ group exists in a —$SO_3H$ form.

SYNTHESIS EXAMPLE 4

Synthesis of Solid Acid (Refer to Reaction Scheme 3)

5 g of SWNT was immersed in 500 ml of a mixture of sulfuric acid ($H_2SO_4$) and nitric acid ($HNO_3$) mixed at a volume ratio of 3:1 and ultrasonic waves were applied to the result at 60° C. for 24 hours.

Then, 1000 ml of deionized water was added to the result for dilution and centrifugal separation was performed at 400 rpm for 20 minutes. The product was then filtered using a membrane filter with a pore diameter of 0.1 μm and washed 3 times with deionized water. The washed result was dried under reduced pressure at 40° C. for 24 hours to obtain 1.0 g of carboxylated SWNT (A).

1.0 g of the carboxylated SWNT (A) and 100 mL of N,N-dimethylformamide were poured in a 200 mL 3-neck round bottom flask and sonication was performed for 24 hours to disperse the carboxylated SWNT. 2.5 g of triethylamine and 5.10 g of 3-bromopropanesulfonic acid sodium salt were poured in the sonicated result and left to react at 110° C. for 24 hours in a nitrogen atmosphere.

When the reaction was completed, the result was filtered under reduced pressure using a polytetrafluoroethylene membrane with a pore diameter of 0.1 μm to remove a solvent and the result was washed 2 times with methanol.

The washed result was added to 100 mL of a 2 N aqueous hydrochloric solution and stirred for 1 hour. Then, using a centrifugal separator, a slurry of the product was separated. The separated slurry was filtered under reduced pressure, washed 2 times with methanol and then dried at 50° C. for 24 hours to manufacture a sulfonated SWNT solid acid.

Example 1

Manufacturing Polymer Electrolyte Membrane

A composite for forming a polymer electrolyte membrane was manufactured by mixing 25 parts by weight of polyimide, 0.33 parts by weight of the sulfonated CNT obtained according to Synthesis Example 1, and 74.67 parts by weight of N-methylpyrrolidone as a solvent.

The composite for forming the polymer electrolyte membrane was spin coated and a preliminary heat treatment was performed thereon at 90° C. for 10 minutes.

Then, a heat treatment was performed on the result at 200° C. for 1.5 hours to manufacture the polymer electrolyte membrane (film thickness: 15 μm).

Example 2

A polymer electrolyte membrane (film thickness: 15 μm) was manufactured according to Example 1, except that the weight ratio of polyimide to the sulfonated CNT obtained according to Synthesis Example 1 was 25:0.83.

Example 3

A polymer electrolyte membrane (film thickness: 97 μm) was manufactured according to Example 2, except that the weight ratio of polyimide to the sulfonated CNT obtained according to Synthesis Example 1 was 25:0.33.

Example 4

A polymer electrolyte membrane (film thickness: 30 μm) was manufactured according to n Example 1, except that the weight ratio of NAFION™ to the sulfonated CNT obtained according to Synthesis Example 1 was 15:1. Then, the polymer electrolyte membrane was immersed in a 1 M aqueous hydrochloric solution at 80° C. for protonation and rinsed several times with distilled water to obtain the polymer electrolyte membrane.

Example 5

A polymer electrolyte membrane was manufactured according to Example 4, except that the film thickness of the polymer electrolyte membrane was 49 μm and a protonation process was excluded.

Example 6

A polymer electrolyte membrane (film thickness: 32 μm) was manufactured according to Example 1, except that the weight ratio of NAFION™ to the sulfonated CNT obtained according to Synthesis Example 1 was 15:0.5.

Example 7

A polymer electrolyte membrane (film thickness: 29 μm) was manufactured according to Example 1, except that the solid acid obtained according to Synthesis Example 2 was used instead of the solid acid obtained according to Synthesis Example 1, and NAFION™ was used instead of polyimide.

Example 8

A polymer electrolyte membrane (film thickness: 24 μm) was manufactured according to Example 1, except that the solid acid obtained according to Synthesis Example 3 was used instead of the solid acid obtained according to Synthesis Example 1, and NAFION™ was used instead of polyimide.

Comparative Example 1

Manufacturing Polymer Electrolyte Membrane

A composite for forming a polymer electrolyte membrane was obtained by mixing 30 parts by weight of polyimide and 70 parts by weight of N-methylpyrrolidone as a solvent.

The composite for forming a polymer electrolyte membrane was coated and a preliminary heat treatment was performed thereon at 80° C. for 10 minutes. Then, a hard baking process was performed under a nitrogen atmosphere at 200° C. for 1.5 hours to manufacture the polymer electrolyte membrane (film thickness: 23 μm).

Comparative Example 2

Manufacturing Polymer Electrolyte Membrane

A composite for forming a polymer electrolyte membrane was obtained by mixing 30 parts by weight of polyimide and 70 parts by weight of N-methylpyrrolidone as a solvent.

The composite for forming a polymer electrolyte membrane was coated and a preliminary heat treatment was performed at 80° C. for 10 minutes. Then, a hard baking process was performed in a nitrogen atmosphere at 200° C. for 1.5 hours to manufacture the polymer electrolyte membrane (film thickness: 18 μm).

Comparative Example 3

Manufacturing Polymer Electrolyte Membrane 16 parts by weight of a NAFION™ solution (Dupont) instead of polyimide and 1.2 parts by weight of the CNT to which a carboxyl group was attached dispersed in isopropyl alcohol was attached were blended for 24 hours to coat the composite for forming a polymer electrolyte membrane and a preliminary heat treatment was performed at 80° C. for 10 minutes. Then a heat treatment was performed at 100° C. for 1.5 hours to manufacture a polymer electrolyte membrane (film thickness: 26 μm).

Comparative Example 4

Manufacturing Polymer Electrolyte Membrane 20 parts by weight of a NAFION™ solution (Dupont) instead of polyimide was coated to the composite for forming a polymer electrolyte membrane and a preliminary heat treatment was performed at 80° C. for 10 minutes. Then, a heat treatment was performed at 100° C. for 1.5 hours to manufacture a polymer electrolyte membrane (thickness: 90 μm).

Comparative Example 5

Manufacturing Polymer Electrolyte Membrane

A composite for forming a polymer electrolyte membrane was manufactured by mixing 25 parts by weight of polyimide, 1 portion by weight of sulfonated fullerene obtained according to Synthesis Example 1 except that fullerene was used instead of a CNT, and 74 parts by weight of N-methylpyrrolidone as a solvent.

The composite for forming the polymer electrolyte membrane was spin coated and a preliminary heat treatment was performed at 90° C. for 10 minutes.

Then, a polymer electrolyte membrane with a film thickness of 67 μm was manufactured by performing a heat treatment at 200° C. for 1.5 hours.

The ionic conductivities of the polymer electrolyte membranes obtained according to Examples 1 through 8 and Comparative Examples 1 through 5 were measured and the results are illustrated in Table 1 below. The ionic conductivity was measured by immersing the membrane in distilled water for a sufficient amount of time, interposing the membrane between two electrodes, applying an alternating current (10 mV amplitude) at various frequencies in the range of 1 Hz to 4 MHz to the membrane using a 2-point probe method, and measuring complex impedance at each frequency using an impedance analyzer. Using the measured resistance of the membrane, the ionic conductivity was calculated using Formula 1 below:

Formula 1

$$\sigma = I/(R \times S),$$

where σ is the ionic conductivity, I is the thickness of the membrane, R is the resistance of the membrane, and S is the cross section of the membrane.

TABLE 1

| | proton conductivity (S/cm) | Thickness of polymer electrolyte membrane (μm) | Weight ratio of ionic conducting polymer to solid acid |
|---|---|---|---|
| Example 1 | $4.69 \times 10^{-4}$ | 15 | 25:0.33 |
| Comparative Example 1 | $2.6 \times 10^{-6}$ | 23 | 30:0 |
| Example 2 | $5.36 \times 10^{-5}$ | 55 | 25:0.83 |
| Example 3 | $2.2 \times 10^{-7}$ | 98 | 25:0.33 |
| Comparative Example 2 | $1.02 \times 10^{-7}$ | 18 | 30:0 |
| Example 4 | $1.16 \times 10^{-3}$ | 30 | 15:1 |
| Example 5 | $9.20 \times 10^{-4}$ | 49 | 15:1 |
| Example 6 | $8.81 \times 10^{-4}$ | 32 | 15:0.5 |
| Comparative Example 3 | $2.17 \times 10^{-4}$ | 26 | 16:1.2 |
| Comparative Example 4 | $8.52 \times 10^{-4}$ | 90 | 20:0 |
| Comparative Example 5 | $5.84 \times 10^{-6}$ | 67 | 25:1 |
| Example 7 | $1.3 \times 10^{-4}$ | 29 | 20:0.037 |
| Example 8 | $0.5 \times 10^{-4}$ | 24 | 16:1.2 |

As illustrated in Table 1, ionic conductivity was better when the membrane was manufactured by blending a CNT to which a sulfonate group was attached with a polymer electrolyte membrane than when using a nanotube to which a carboxyl group was attached as a solid acid or when using sulfonated fullerene as a solid acid.

Example 9

Preparing Fuel Cell

A fuel cell having the polymer electrolyte membrane obtained according to Example 1 was manufactured as follows.

A carbon supported platinum (Pt/C) catalyst was used as a cathode and a carbon supported platinum-ruthenium (Pt-Ru/C) catalyst was used as an anode.

The polymer electrolyte membrane of Example 1 was interposed between the cathode and the anode and the result was hot-pressed at 120° C. at a pressure of 5 MPa to manufacture a Membrane and electrode assembly (MEA) for a fuel cell.

A bipolar plate for supplying fuel and a bipolar plate for supplying an oxidant were respectively attached to the anode and the cathode of the fuel cell and then the performance of the fuel cell was determined. The operating conditions were as follows: 3 mL/min of a 1 M aqueous methanol solution as fuel, 50 ml/min of air as an oxidant, and an operating temperature of 50° C.

Example 10

Preparing Fuel Cell

A fuel cell was prepared according to Example 9, except that the polymer electrolyte membrane of Example 4 was used instead of the polymer electrolyte membrane of Example 1.

Comparative Example 6

A fuel cell was prepared according to Example 9, except that the polyimide electrolyte membrane of Comparative Example 1 was used instead of the polymer electrolyte membrane of Example 1.

Comparative Example 7

A fuel cell was prepared according to Example 9, except that a NAFION™ membrane was used instead of the polymer electrolyte membrane of Example 4.

Figure 6:
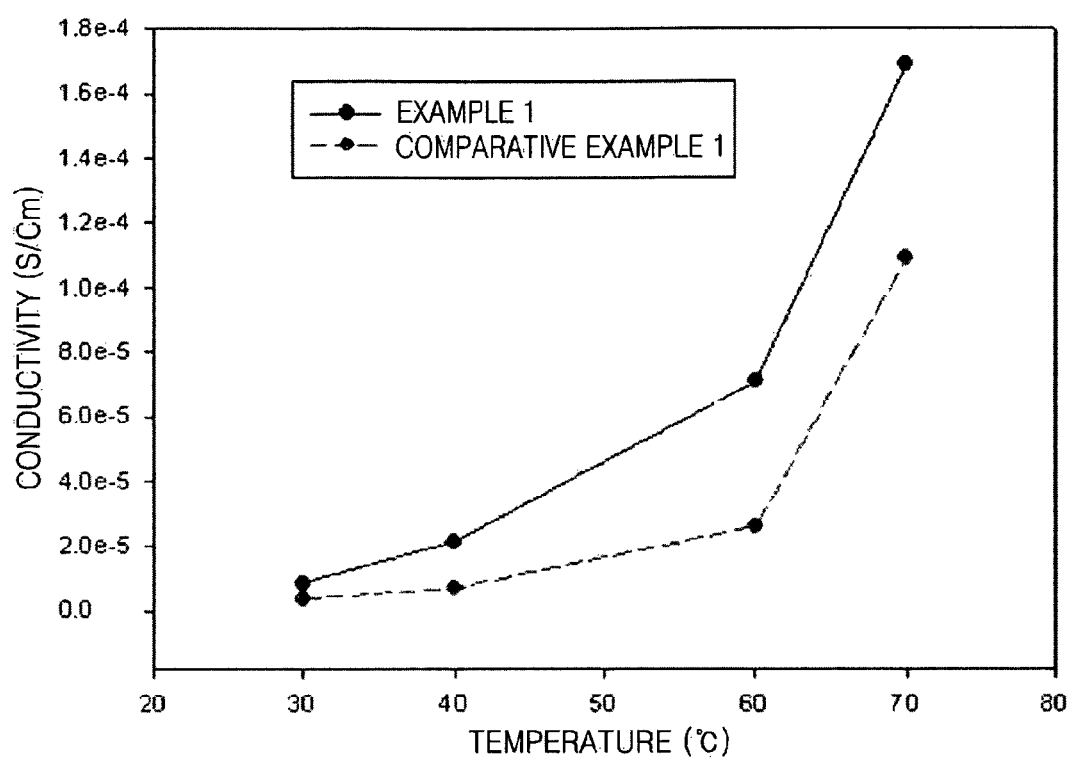
FIG. 6 is a graph illustrating the ionic conductivity according to temperature of polymer electrolyte membranes obtained according to Example 1 and Comparative Example 1.

Ionic conductivity with respect to temperature was investigated for the polymer electrolyte membranes obtained according to Example 1 and Comparative Example 1, and the results are illustrated in FIG. 6.

The ionic conductivity was measured by immersing the membrane in distilled water for a sufficient amount of time, interposing the membrane between two electrodes, applying an alternating current (10 mV amplitude) at various frequencies in the range of 1 Hz to 4 MHz to the membrane using a 2-point probe method, and measuring complex impedance at each frequency using an impedance analyzer. Using the measured resistance of the membrane, the ionic conductivity was calculated using Formula 1 above. This process was performed in a chamber in which the humidity was maintained at 90% by appropriately adjusting the temperature.

Referring to FIG. 6, when a membrane was manufactured by blending a CNT to which a sulfonate group was attached and a polymer electrolyte membrane, the ionic conductivity was improved, particularly for higher temperatures.

Figure 7:
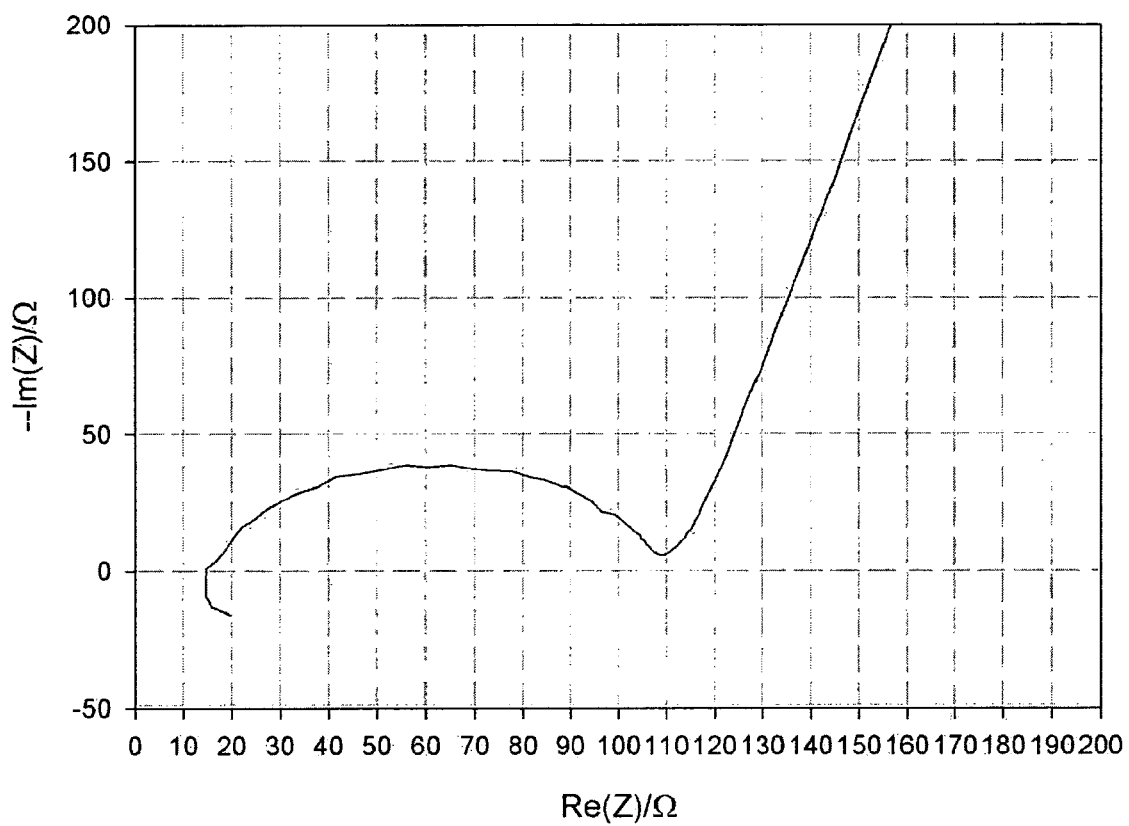
FIGS. 7 and 8 illustrate the results of an impedance test for the polymer electrolyte membrane of Example 1 and a polyimide membrane performed after being deposited in water for 24 hours.
Figure 8:
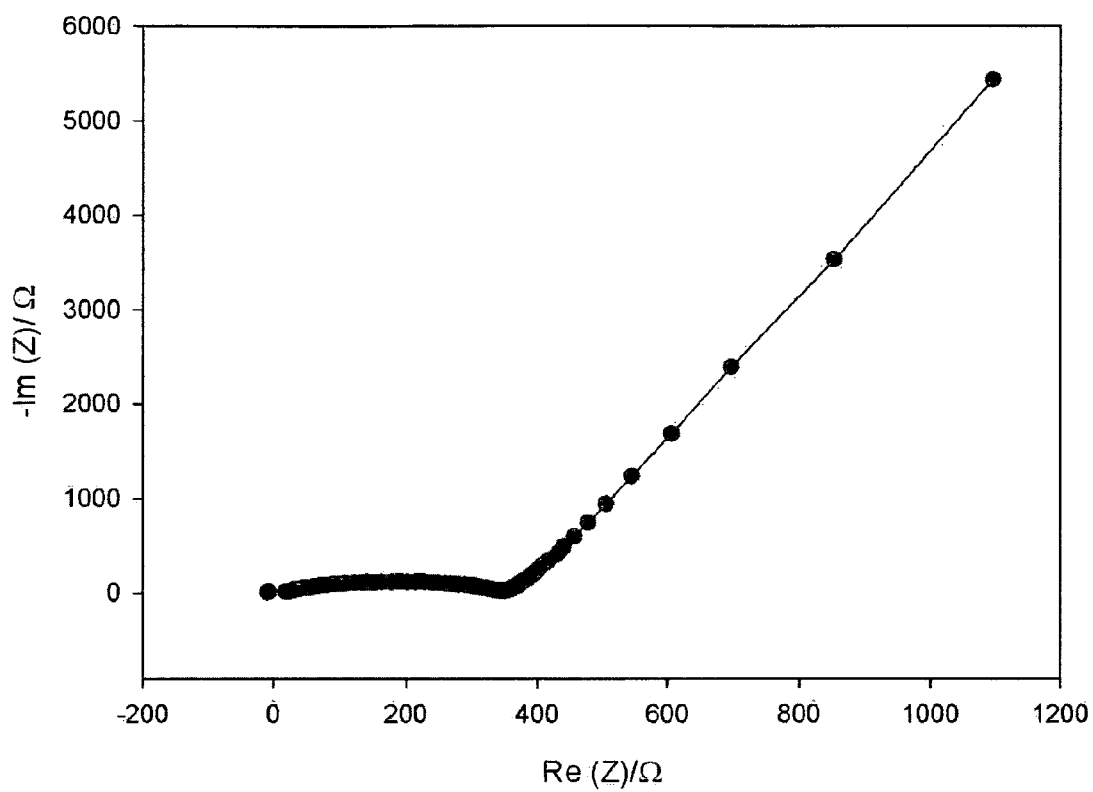

FIGS. 7 and 8 illustrate the results of an impedance test for the polymer electrolyte membrane of Example 1 and a polyimide membrane performed after being immersed in distilled water for 24 hours.

Referring to FIGS. 7 and 8, the measured impedance z was represented by Z=Re(Z)+iIm (Z).

Figure 9:
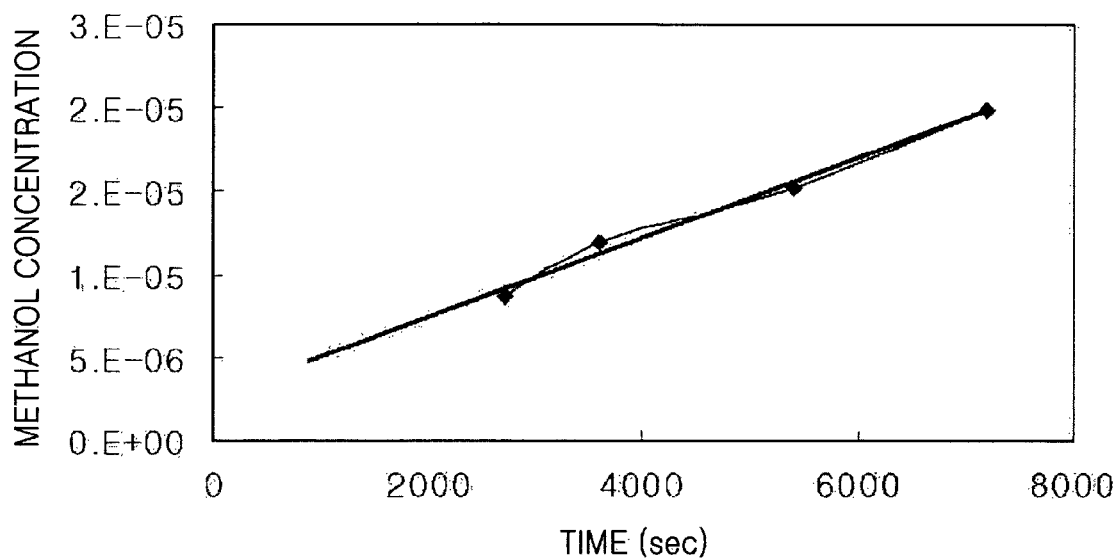
FIG. 9 is a graph illustrating the permeability of methanol in a fuel cell using a polyimide membrane as a polymer electrolyte membrane.

FIG. 9 illustrates the permeability of methanol in a fuel cell using the polyimide membrane as the polymer electrolyte membrane.

Referring to FIG. 9, the permeability of methanol was $2.73 \times 10^{-9}$ cm$^2$/s.

Figure 10:
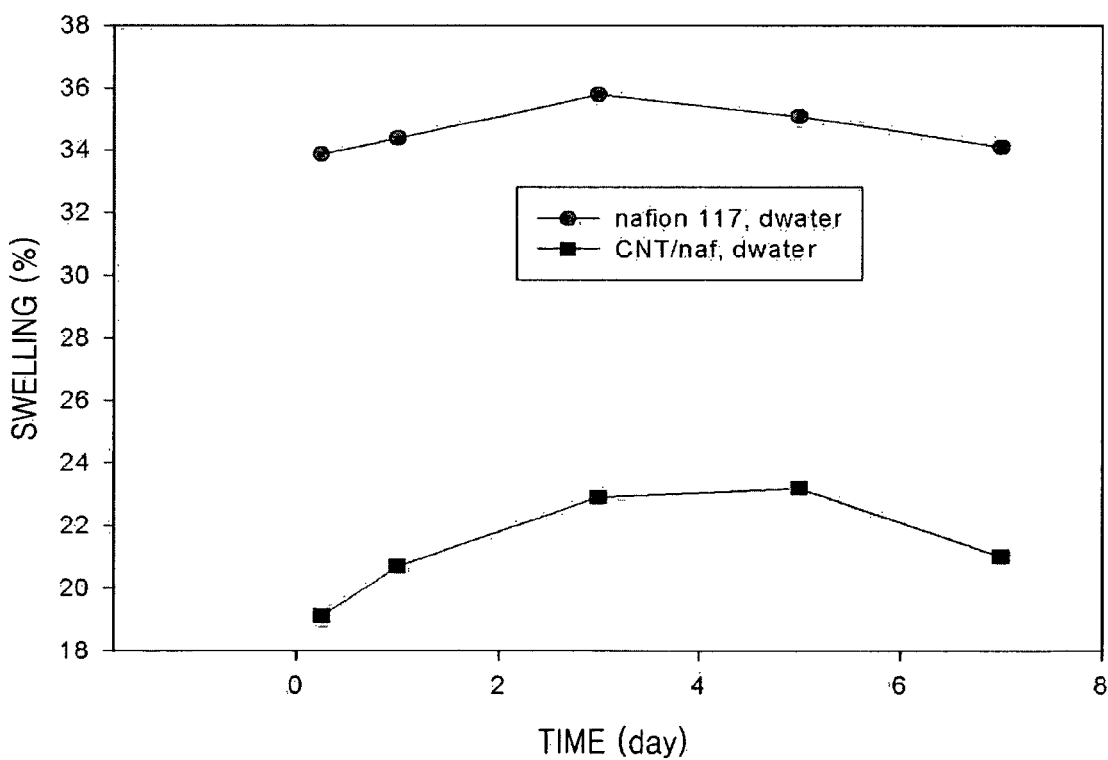
FIG. 10 is a graph illustrating the degree of swelling of polymer electrolyte membranes of Example 5 and Comparative Example 4 and a NAFION™ membrane.

FIG. 10 illustrates the degree of membrane swelling of the polymer electrolyte membranes of Example 5 and Comparative Example 4 and a NAFION™ membrane are immersed in distilled water. Also, the permeation of methanol in a membrane was measured at an ambient temperature using diffusion cells. To measure the permeability of methanol, the membrane was interposed between two cells and the concentration of the methanol permeating the membrane was measured in a constant time interval by gas chromatography analysis. From the measurement, the permeability of the methanol was calculated.

Referring to FIG. 10, inclusion of sulfonated nanotube suppressed swelling of the NAFION™ membrane (about 35%) by 23% and reduced the permeability of methanol from $1.58 \times 10^{-6}$ cm$^2$/s to $1.01 \times 10^{-6}$ cm$^2$/s. Example 11

Preparation of Polymer Electrolyte Membrane 1.5 g of sulfonated polyethersulfone was dissolved in 3.5 g of N-methylpyrrolidone and the result was mixed with 5 g of polyamic acid in which 30 wt % of solid content was dissolved with respect to N-methylpyrrolidone. 0.03 g of the sulfonated SWNT represented by Chemical Formula 5 obtained according to Synthesis Example 4 was added to the mixed polymer solution and stirred for 4 hours to manufacture a composite for forming a polymer electrolyte membrane.

The composite for forming the polymer electrolyte membrane was spin coated and a preliminary heat treatment was performed thereon at 90° C. for 10 minutes.

Then, a heat treatment was performed on the result at 260° C. for 1.5 hours to manufacture a polymer electrolyte membrane (film thickness: 15 μm).

Example 12

Preparation of Fuel Cell

A fuel cell having the polymer electrolyte membrane obtained according to Example 11 was manufactured as follows.

A carbon supported platinum (Pt/C) catalyst was used as a cathode and a carbon supported platinum-ruthenium (Pt-Ru/C) catalyst was used as an anode.

The polymer electrolyte membrane of Example 1 was interposed between the cathode and the anode and the result was hot-pressed at 120° C. at a pressure of 5 MPa to manufacture an MEA for a fuel cell.

A bipolar plate for supplying fuel and a bipolar plate for supplying an oxidant were respectively attached to the anode and the cathode of the fuel cell, and then the performance of the fuel cell was determined. The operating conditions were as follows: 3 mL/min of a 1 M aqueous methanol solution as fuel, 50 ml/min of air as an oxidant, and an operating temperature of 50° C.

Comparative Example 8

A polymer electrolyte membrane was prepared according to Example 11, except that the sulfonated SWNT obtained according to Synthesis Example 4 was excluded.

Comparative Example 9

A fuel cell was prepared according to Example 12, except that the polymer electrolyte membrane of Comparative Example 8 was used instead of the polymer electrolyte membrane of Example 11.

Figure 11:
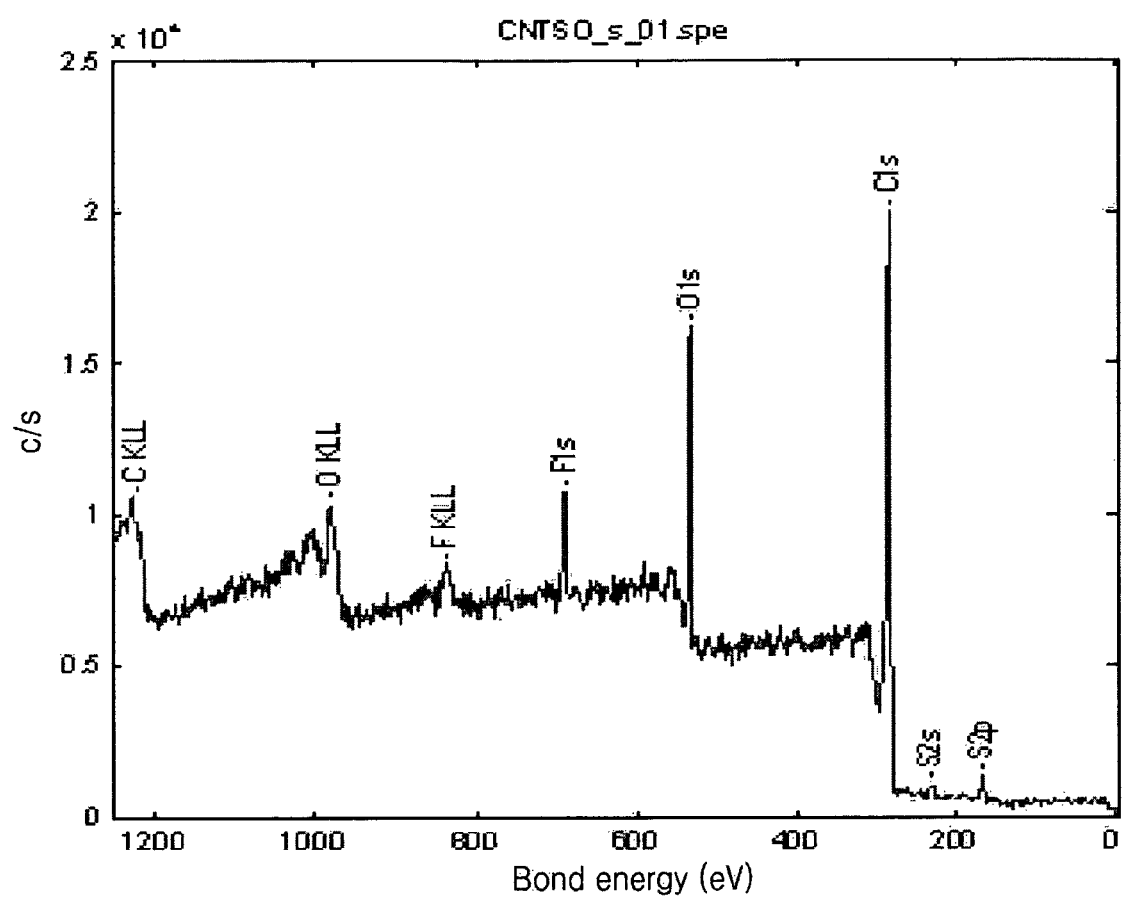
FIG. 11 is a graph illustrating XPS analysis results of sulfonated single wall carbon nanotube (SWNT) obtained according to an embodiment of the present invention.

XPS analysis of the sulfonated SWNT obtained according to Synthesis Example 4 was performed, and the results are illustrated in FIG. 11.

As can be seen from FIG. 11, the sulfonate group was introduced to the SWNT.

The ionic conductivities of the polymer electrolyte membranes of Example 11 and Comparative Example 8 were measured in the same manner as described above for the polymer electrolyte membranes obtained according to Example 1 and Comparative Example 1.

It was determined that the ionic conductivities of the polymer electrolyte membranes of Comparative Example 8 and Example 11 were $1.4 \times 10^{-4}$ S/cm and $6.0 \times 10^{-4}$ S/cm, respectively, and thus the polymer electrolyte membrane according to an embodiment of the present invention showed much improvement over the conventional polymer electrolyte membrane.

Also, the permeability of methanol in the polymer electrolyte membranes according to Example 11 and Comparative Example 8 was measured at an ambient temperature, 25° C. using diffusion cells. To measure the permeability of methanol, the membrane was interposed between two cells and the concentration of the methanol permeating the membrane was measured in a constant time interval by gas chromatography analysis. As a result, it was determined that the permeability of methanol in the polymer electrolyte membranes according to Example 11 and Comparative Example 8 were $7.2 \times 10^{-8}$ cm$^2$/s and $8.5 \times 10^{-8}$ cm$^2$/s, respectively.

Moreover, cell potential versus current density of the fuel cells according to the Example 12 and Comparative Example 9 was investigated and it was found that the cell potential of the fuel cell of Example 12 was better than that of the fuel cell of Comparative Example 9.

A polymer electrolyte membrane using a solid acid of the present invention has high ionic conductivity and an excellent suppression of the cross-over of methanol. Also, the suppression of membrane swelling is excellent since the solid acid is added to.

Moreover, if a polymer electrolyte membrane is manufactured using the solid acid according to Chemical Formula 1 of the present invention, ionic conductivity is greatly improved. In addition, if the polymer electrolyte membrane contacts water or methanol, the solid acid is not extracted since it has a bulky structure and the influence onto the mechanical strength of the membrane can be reduced by adding a small amount of the solid acid to the membrane. Also, since the CNT cut by an acid treatment is used, a size of the CNT solid acid is minimized and thus, dispersion is easy.

The polymer electrolyte membrane can be used as an electrolyte membrane of a fuel cell, for example, a DMFC.

While the present invention has been described with reference to exemplary embodiments thereof, it will be understood by those of ordinary skill in the art that various changes in form and details may be made therein without departing from the spirit and scope of the present invention as defined by the following claims.

What is claimed is:

1. A solid acid represented by Chemical Formula 1:
Chemical Formula 1
CNT—(CO—R$_1$—X)$_n$
where CNT is a single walled carbon nanotube (SWNT) or a multi walled carbon nanotube, R$_1$ is a divalent organic group, X is a univalent ionically conductive functional group, and n is an integer equal to or greater than 1.

2. The solid acid of claim 1, wherein R$_1$ is —OR$_2$— or —NHR$_3$— and R$_2$ and R$_3$ are each independently a divalent aromatic group, a divalent aliphatic group, or a divalent aromatic group substituted with an aliphatic substituent.

3. The solid acid of claim 2, wherein the aromatic group includes a compound selected from the group consisting of unsubstituted phenylene (—$C_6H_4$—); a substituted phenylene selected from the group consisting of —$C_6H_3X_1$— and —$C_6H_2(X^2)_2$—; —$C_6H_4NHC_6H_3X^3$—; —$C_6H_4COC_6H_4$—; —$C_6H_4SC_6H_4$—(diphenyl sulfide); unsubstituted naphthylene (—$C_{10}H_6$—); and substituted naphthylene (—$C_{10}H_4X^4$—) where $X_1$ through $X_4$ are each independently —F, —Cl, —Br, —I, —$NH_2$, a methyl group, an ethyl group, a propyl group, a methoxy group, an ethoxy group, a hydroxy group, a nitro group, or a propyloxy group.

4. The solid acid of claim 2, wherein the aliphatic group includes a compound selected from the group consisting of —$(CH_2)_n$—, wherein n is an integer in the range of 1 to 12, —$CH_2CH_2O$—, —$CH_2CH_2CH(OH)$—, —$CH_2CH(OH)CH_2$—, —$CH_2COCH_2CH_2$—, —$(CH=CH)_n$—, wherein n is an integer in the range of 1 to 12, —$(CH_2CH_2NH)$—, —$C_3H_4$—(cyclopropane), —$C_5H_8$—(cyclopentane), —$C_6H_{10}$—(cyclohexane), and —$CH_2C_6H_{10}$—.

5. The solid acid of claim 2, wherein the aromatic group substituted with the aliphatic substituent includes a compound selected from the group consisting of —$C_6H_4(CH_2)_n$—, wherein n is an integer in the range of 1 to 3, —$C_6H_4CONHCH_2CH_2$—, —$CH_2C_6H_4SC_6H_4CH_2$—, and —$C_6H_4CH_2CH_2$—.

6. The solid acid of claim 2, wherein the ionically conductive functional group includes at least one compound selected from the group consisting of —$SO_3H$, —COOH, —$PO_3H$, —OH and —$OSO_3H$.

7. The solid acid of claim 1, wherein the length of the CNT in Chemical Formula 1 is 500 nm or less.

8. The solid acid of claim 1, wherein the solid acid is represented by Chemical Formula 3 or Chemical Formula 4

Chemical Formula 3

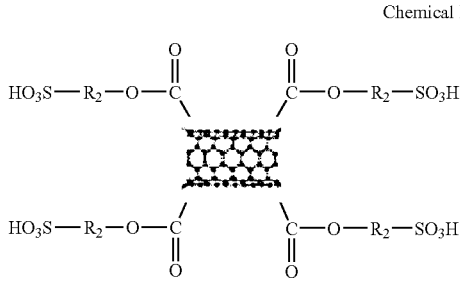

where $R_2$ is a C1-C20 alkylene group

Chemical Formula 4

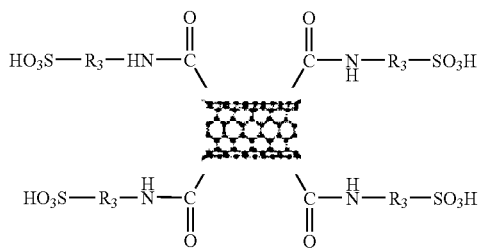

where $R_3$ is a $C_1$-$C_{20}$ arylene group.

9. The solid acid of claim 8, wherein the solid acid is represented by Chemical Formula 5 or Chemical Formula 6:

Chemical Formula 5

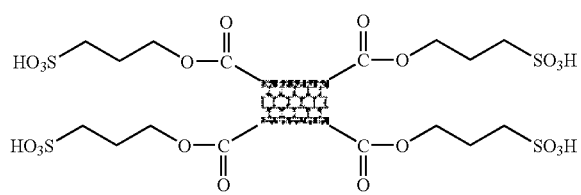

Chemical Formula 6

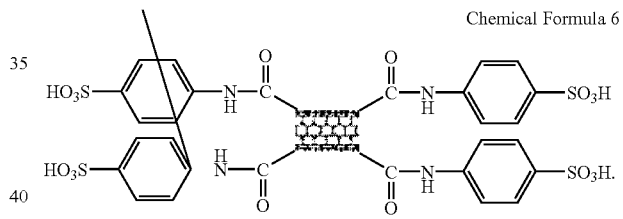

10. The solid acid of claim 1, wherein n is about 13.

* * * * *